United States Patent [19]
Kuruvila et al.

[11] Patent Number: 6,112,315
[45] Date of Patent: Aug. 29, 2000

[54] PROCESS AND APPARATUS FOR REDUCING SOFTWARE FAILURES USING SPARING IN DISTRIBUTED SYSTEMS

[75] Inventors: Johnson Kuruvila, Nepean; Rod Story, Ottawa; Bill W. C. Gage, Stittsville, all of Canada

[73] Assignee: Nortel Networks Corporation, Montreal, Canada

[21] Appl. No.: 08/936,119

[22] Filed: Sep. 24, 1997

[51] Int. Cl.[7] .................................................. G06F 11/00
[52] U.S. Cl. ............................................................. 714/38
[58] Field of Search ................................... 714/2, 3, 4, 6, 714/11, 13, 38; 395/704, 705, 706; 370/220, 226

[56] References Cited

U.S. PATENT DOCUMENTS

| | | | |
|---|---|---|---|
| 4,885,684 | 12/1989 | Austin et al. | 395/706 |
| 5,864,653 | 1/1999 | Tavallaei et al. | 714/2 |
| 5,923,830 | 7/1999 | Fuchs et al. | 714/11 |

OTHER PUBLICATIONS

*Software Fault Tolerance in the Application Layer*, Yennun Huang and Chandra Kintala, John Wiley & Sons Ltd. (1995), Chapter 10, pp. 231–248.

*Primary Examiner*—Robert W. Beausoliel, Jr.
*Assistant Examiner*—Pierre Eddy Elisca

[57] ABSTRACT

A software sparing process and apparatus to reduce the likelihood of software failures is provided. Software sparing provides software entities, called spares, which take over and provide similar functionality as the failed system to the clients of the failed entity. They also permit the introduction of new software versions with no loss in service during the switch over period. These spare entities, which may be located on different nodes in a system, communicate using a standard interface protocol. Sparing is done at the software "chunk" level instead of at the hardware box level, which is the common practice, resulting in lower costs and improved reliability. A computer readable storage medium containing a program element to direct a processor of a computer to implement the software sparing process described earlier is also provided.

33 Claims, 7 Drawing Sheets

Figure 1

Spared Entity

Attributes (Private)
   sparing_status
   sparing_mode
   sparing_state
   sparing_groupid
   inquiry_message_interval
   inqiury message_number

Methods (Private)
   send_inquiry_message()
   send_checkpoint()
   send_journal()

Methods (Public)
   set_sparing_status()
   get_sparing_status()
   set_sparing_mode()
   get_sparing_mode()
   get_sparing_state()
   get_sparing_groupid()
   set_inquiry_message_interval()
   get_inquiry_message_interval()
   set_inquiry_message_number()
   get_inquiry_message_number()
   set_partner()
   start_sparing()
   start_sparing_ack()
   start_inquiry_message()
   receive_inqiury_message()
   receive_inqiury_message_ack()
   start_checkpoint()
   start_checkpoint_ack()
   receive_journal()
   start_switchover()
   register()

PROCESS AND APPARATUS FOR REDUCING SOFTWARE FAILURES USING SPARING IN DISTRIBUTED SYSTEMS

FIELD OF THE INVENTION

This invention relates to a process and apparatus for reducing the likelihood of failures in real-time and other software systems. It is applicable to server software systems specifically those applicable to telecommunication networks and may be used to prevent damages that could occur due to equipment faults by allowing the system to recover from software failures with no degradation in service through the use of software spare components. The invention also provides a computer readable storage medium containing a program element to direct a processor of a computer to implement the software sparing process.

BACKGROUND

Software companies spend considerable funds in research and development (R&D) for the conception and implementation of software be it control software, such as the microwave controller or telephone system, or application software, such as spread sheets or word processors. Furthermore, the maintenance of such systems has proven to be quite costly.

Of particular concern in software server systems is the occurrence of faults. Failure of server software can occur because of a problem with the hardware on which the application is being executed or because of a run time error in a software system. These failures can result in reduced functionality or complete failure of a telecommunication network, thereby reducing the availability and reliability of the network as a whole which could result in catastrophic accidents or significant losses in revenues for the service provider. In a specific example, take telecommunication networks that form the backbone of modern communications where millions of transactions are performed daily. A certain amount of reliability is expected by the subscribers to obtain continued service even in the case of component failure. As another example, computer systems in an aircraft must continue to operate until the plane has landed and the computers in air traffic control systems must be continuously available. Any failure in these systems could have serious repercussions.

Reliability in such systems is often achieved through a process commonly known as component redundancy. Redundancy provides a means by which the functionality of vital parts of a system can be maintained even when the vital part is faulty through the use of a "spare". A spare replaces the original component of the system and provides some or all the services that the original component performed. Sometimes, the spare is an exact replica of the original or master component and can replace completely the faulty master part. Other times, it is a less costly and less developed version of the master and can only be used to temporarily replace the master until the latter is repaired or replaced.

A great majority of components involved in network communication are software based. In telecommunication networks, as in a great majority of control systems, the current typical process of providing a spare consists in purchasing duplicate hardware items of all the vital parts of the system or, alternatively, reinstalling the software from scratch. When a fault occurs in one of the parts, the hardware affected is replaced by the spare while the original is being fixed or replaced. If there is a problem with the software, the system must be taken offline and the software must be reinstalled. In both situations, this often leads to a prolonged down time for the system. Furthermore, this implies that even if there is a problem with a small sub-system of a network node, the entire node would have to be replaced by a spare and some of the most recent system status information may be forever lost. Therefore, this is a very costly and inflexible solution.

Thus, there exists a need in the industry to provide an improved process of redundancy and fault recovery such as to obtain better software systems with a high degree of reliability particularly applicable to applications with distributed software components.

OBJECTS AND STATEMENT OF THE INVENTION

An object of the invention is to provide an improved process and apparatus for performing software component redundancy, particularly well suited in the context of real-time distributed telecommunication systems.

Another object of this invention is to provide a computer readable storage medium containing a program element that directs a system to perform the substitution of a faulty software component by a spare software component.

The description of this process has been directed specifically to object oriented designs and hence uses the terminology of this field. The processes and principles described below and in the pages that follow can be applied to function-oriented designs as well without detracting from the spirit of this invention.

As embodied and broadly described herein the invention provides a computing apparatus including a program element, said program element implementing a group of functional entities, said group comprising:

- a first object capable of effecting at least one predetermined task, said first object capable of selectively acquiring either one of an active status and a passive status, in said active status said first object is enabled of carrying out said predetermined task, in said passive status said first object being disabled from performing said predetermined task;
- a second object capable of effecting said predetermined task;
- data synchronization means for effecting transfer of data in said second object utilized for effecting said predetermined task to said first object;
- operational status determination means to determine an operational status of said second object, said first object acquiring said active status when said operational status determination means determining that said second object has acquired a predetermined operative condition.

For the purpose of this specification the word "master" is used to designate a software object of the system which supplies services to other objects in the system.

For the purpose of this specification the word "spare" is used to designate a software object capable of acquiring the functionality of a master in the case where the latter becomes faulty.

For the purpose of this specification the word "journalling" is used to designate a unidirectional or a multidirectional data exchange process between software components. With this data exchange transaction, data is sent from a master component to a spare component or vice versa in order to keep both components in a state such that the spare can acquire the functionality of the master and thus continue performing one or more of the tasks the master was performing before it failed.

For the purpose of this specification the expression "checkpointing" is used to designate the initial phase of journalling where dynamic data from the master is transmitted to the spare.

For the purpose of this specification the word "object" is used to designate a software entity that has a state and a set of operations which operate on that state.

For the purpose of this specification the word "method" is used to designate the functions encapsulated in an object, which permit external objects to communicate and manipulate the object.

For the purpose of this specification the expression "container object" is used to designate a compound object formed by a collection of similar objects with a common interface to the outside world and a common thread of control.

For the purpose of this specification, the expression "inquiry message" designates a message exchanged between the master and the spare entities that allows the spare to monitor the status of the master.

In a most preferred embodiment of this invention, the software sparing process is used to provide sparing capabilities to an object or a group of objects, such as one that could be used in a software application, to enable the object to provide reliable service in the face of component failure. This is done by providing a base "Spared Entity" class which is inherited by all objects wishing to obtain sparing capabilities and a Name Database to lookup the location of any object in a given distributed system. Normally all the critical components of a system will have spares assigned to them.

In a typical interaction, two objects M1 and M2, which both provide the same given service, inherit the spared entity class, which provides them with sparing capabilities. The first object M1 attempts to register with the Name Database as a master. The Name Database positively acknowledges this request and the object begins supplying services to his clients. At a later time, the second object M2 attempts to register with the Name Database as a master under the same service identification as M1. The Name Database refuses this request since a master already exists and returns the location of the master M1. The object M2 then initiates a sparing operation with M1 and then registers with the Name Database as a spare. When the registration is complete, checkpointing begins. During checkpointing all the dynamic data of M1, to which we will from now refer as the master, is copied into M2, from now on referred to as the spare. Once this is done, the master and the spare operate in synchronization. Synchronization implies that every time one of the master's critical variables changes, a journalling operation is performed so that the variables are modified in the spare as well. The spare also periodically sends an inquiry message to the master who acknowledges the message by sending a reply to the spare so that both the master and the spare are able to monitor each other's operational state. If the master fails to reply to a number of inquiry messages issued by the spare, the spare assumes that the master is no longer functional and takes on an active role as a master. Hence the spare takes over for the master and proceeds in supplying the services which were previously supplied by the latter. Because journalling permits the spare to stay in synchronization with the master, this switch over operation, from spare mode to master mode, is transparent to the clients of the service.

As embodied and broadly described herein, the invention further provides machine readable storage medium containing a program element to direct a computing apparatus to implement a group of functional entities, said group comprising:

a first object capable of effecting at least one predetermined task, said first object capable of selectively acquiring either one of an active status and a passive status, in said active status said first object is enabled of carrying out said predetermined task, in said passive status said first object being disabled from performing said predetermined task;

a second object capable of effecting said predetermined task;

data synchronization means for effecting transfer of data in said second object utilized for effecting said predetermined task to said first object;

operational status determination means to determine an operational status of said second object, said first object acquiring said active status when said operational status determination means determining that said second object has acquired a predetermined operative condition.

As embodied and broadly described herein, the invention also provides a method for sparing software in a computing apparatus, said method comprising the steps of:

providing a first software object capable of effecting at least one predetermined task, said first object capable of selectively acquiring either one of an active status and a passive status, in said active status said first object is enabled of carrying out said predetermined task, in said passive status said first object being disabled from performing said predetermined task;

providing a second software object capable of effecting said predetermined task;

effecting at certain intervals transfer of data in said second object utilized for effecting said predetermined task to said first object;

determining at certain intervals an operational status of said second object, said first object acquiring said active status when said second object has acquired a predetermined operative condition.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

The description of this process has been directed specifically to object oriented designs and hence uses the terminology of this field. The processes and principles described below can be applied to function-oriented designs and applications without detracting from the spirit of this invention although some adaptation will have to be made because of the absence of properties such as inheritance in functionally oriented designs.

In this specification, the nomenclature used in object oriented programming has been used. Expression such as "message passing", "class", "object", "inheritance", "encapsulation" are well known in the art of object oriented software design (OOD). For the reader who wishes to consult a reference on the topic of object oriented design, "The Object Concept, an introduction to computer programming using C++" by Rick Decker & Stuart Hirsfield PWS publishing Company, Toronto 1995, presents the basics of OOD. Also, for a basic description of threads and distributed programming the reader may want to consult William Stallings' "Operating Systems", published by Prentice Hall. The content of these documents is hereby incorporated by reference.

The present invention is concerned with a process and devices to provide redundancy at the software level in distributed networks consisting of both hardware and software components in order to obtain more robust systems. In the case of object oriented design, this involves providing a class which supplies the object with sparing capabilities.

In the preferred embodiment of this invention, objects become sparable by inheriting a Spared Entity class that gives them sparing capabilities. These sparable objects operate in an environment that includes an entity herein referred to as the Name Database. The Name Database is an entity which is located at a well-known location in the distributed system and which keeps an entry for every object in the system. The Name Database may keep track of the mode of operation of the object (master/spare), its location in the system as well as assigns a unique identifier to each object. The exact design of the Name Database is not critical for this invention. Most preferably, the Name Database should be capable of keeping a list of all the objects with their location and other parameters and that may be queried by external entities to add an entry, modify a parameter in an entry or supply information about an entry.

Figure 1:
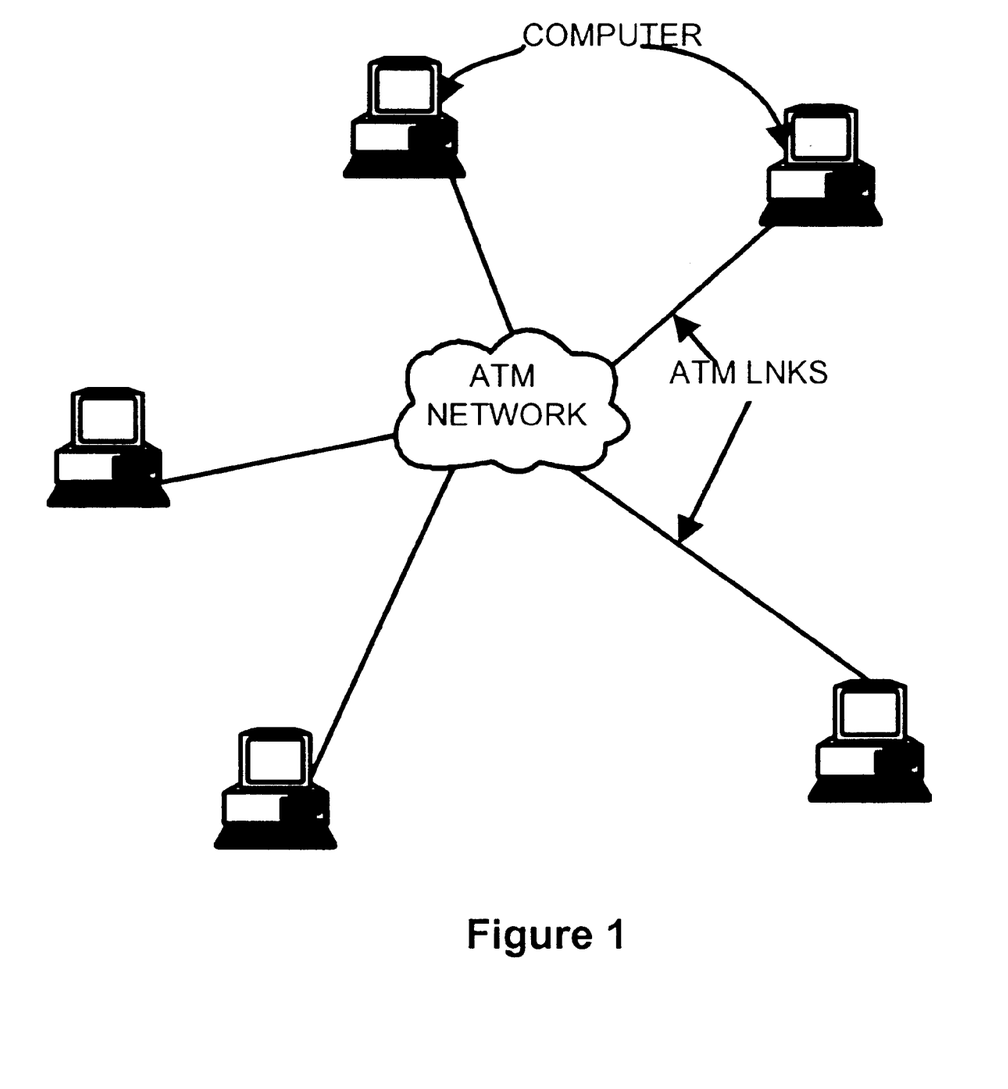
FIG. 1 shows a distributed computing network where the process in accordance with this invention can be implemented.

The systems on which the software applications that may make use of the software sparing methodology process in accordance with this invention, may be discrete computing apparatus or be of a distributed nature, of the type shown in FIG. 1, where different parts of an application run on different computing machines interconnected to form a network. These machines, herein designated as nodes, may reside in geographically remote locations, and communicate using a set of predefined protocols. Protocols such as TCP/IP, client/server architecture and message passing are all possible methods of achieving a distributed computing environment. In addition to these communication protocols a standard communication interface is used, such as those defined by the Object Management Group (OMG,) to allow access to the various objects in the system. For more information on distributed processing, the reader is invited to consult Operating Systems by William Stallings, Prentice Hall $2^{nd}$ edition 1995. The text of this document is included hereby by reference. The preferred embodiment of this invention uses the C++ programming language with a CORBA (Common Object Request Broker Architecture) interface. Other programming languages may be used in the context of the present invention and the use of such a language does not deter from the spirit of this invention.

In the most preferred embodiment of this invention, sparing methods and attributes are encapsulated in a "Spared Entity" super-class that includes the attributes and methods required for software sparing. The Spared Entity super-class is recorded on a computer readable medium containing a program element that instructs the computer in the creation and manipulation of objects of this class. The program element contains the declaration and the code of all the attributes and methods of this class in the form of a software library, an executable code or source code which can be linked to other software modules in order to incorporate software sparing capabilities to an application. The Spared Entity super-class is inherited by all classes in the application requiring sparing capabilities. Preferably, if the software system includes a base class that all the objects in the application inherit, the Spared Entity super-class is inherited by this base class such that all the objects in the application have sparing capabilities. Inheritance is a fundamental concept in Object Oriented programming which allows objects to acquire the properties of other objects which may be either programmed by the application programmer or can be found as standard off-the-shelf components in the form of class libraries. This allows the use of tested code in new applications with no or with minimal adaptation and has for effect the reduction of the cost of software development. It also allows adding features to existing code with little or no change to the latter. The concept of inheritance is described in basic terms in "Software Engineering" by Ian Sommerville, fifth edition by Addison-Wesley publication, 1995 whose content is hereby incorporated by reference.

OVERVIEW OF MAJOR STATES AND ATTRIBUTES

Each sparing object has a set of attributes, which define its state. The state of an object is the values of its attributes at a certain period in time. For instance the state may define whether the object is a master, a spare, whether it is operating in single mode (i.e. no spare) or in dual mode, and others. In the preferred embodiment of this invention, the Spared Entity super-class comprises six attributes: a sparing status, a sparing mode, a sparing state, a group identifier, an inquiry message interval and an inquiry message number. As is usually the case in object oriented designs, the attributes are in the private part of the code such that they cannot be directly accessed by external entities but must be manipulated by the object's methods. Other attributes may be added to these and a few could be omitted or combined without detracting from the spirit of the invention. These attributes are shown in the class diagram on FIG. 2 under the heading "Attributes (private)".

The first attribute, the sparing status, defines whether the sparing capability of the object is enabled or disabled. This variable is checked before initiating any sparing activity. In the case where it is enabled, sparing may take place and activities such as checkpointing, journalling and inquiry message monitoring are permitted. In the case where this variable is disabled, no sparing activity is permitted. This variable may be set by an external method and is preferably done at the initiation of the object.

The second attribute, the sparing mode, defines the disposition of the object of being a master, a spare or being of dynamic nature. In the case of this variable being set to "master" the object may only register with the Name Database in master mode. Although some exceptions may apply, as in the case where the spares are used to share the workload of the master, an object is usually a master when it supplies the services to clients. If a master already exists in the system at the same service address as the object attempting registration, the registration of the object fails and it remains inactive. In the case where the sparing mode is set to "spare", the object may only register as a spare. If a spare already exists at the same service address that the object is trying to use, there should be no problem since a master could be permitted to have many spares. Therefore the spare can register with the Name Database. The third value that this attribute may take is that of "dynamic" which makes the assignment of master/spare mode on a first come first served basis. In effect, the first object to register at a specific service address will be assigned a master mode operation while subsequent objects will be assigned spare mode operation. In all three circumstances (master, spare and dynamic), the internal functioning of the master and spare objects need not be identical. For instance, a higher program version spare could be used to replace the master when this one is taken off the system. Hence, more functions may be available and the internal makeup of these functions can be different. However, it is preferred that the object interfaces of a newer version spare have all the interface elements of the lower version master in order to permit a smooth transition. The mode of operation can be set through external methods and is preferably set at the initialization of the object.

Figure 3:
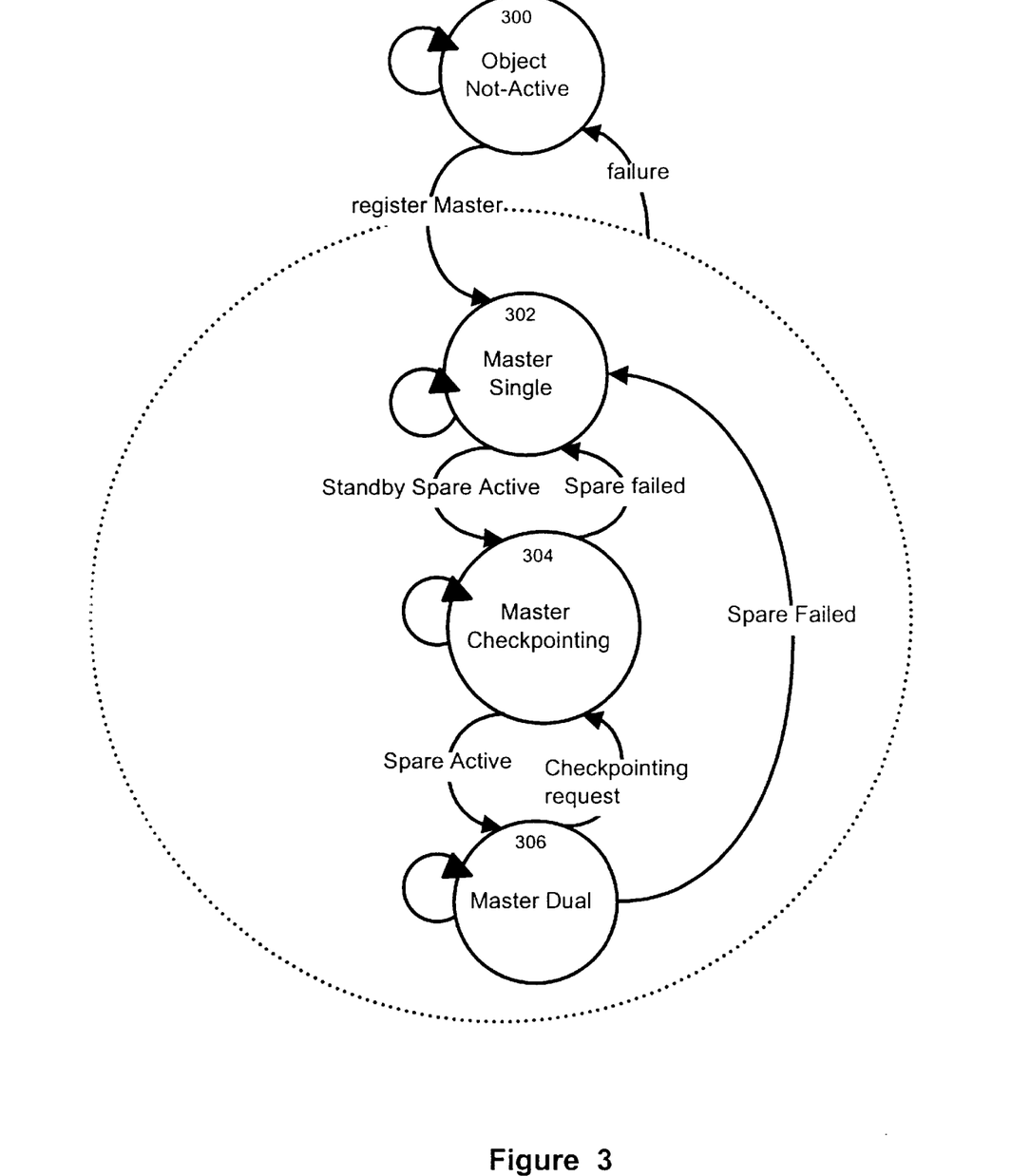
FIG. 3 shows a state transition diagram for a master component.
Figure 4:
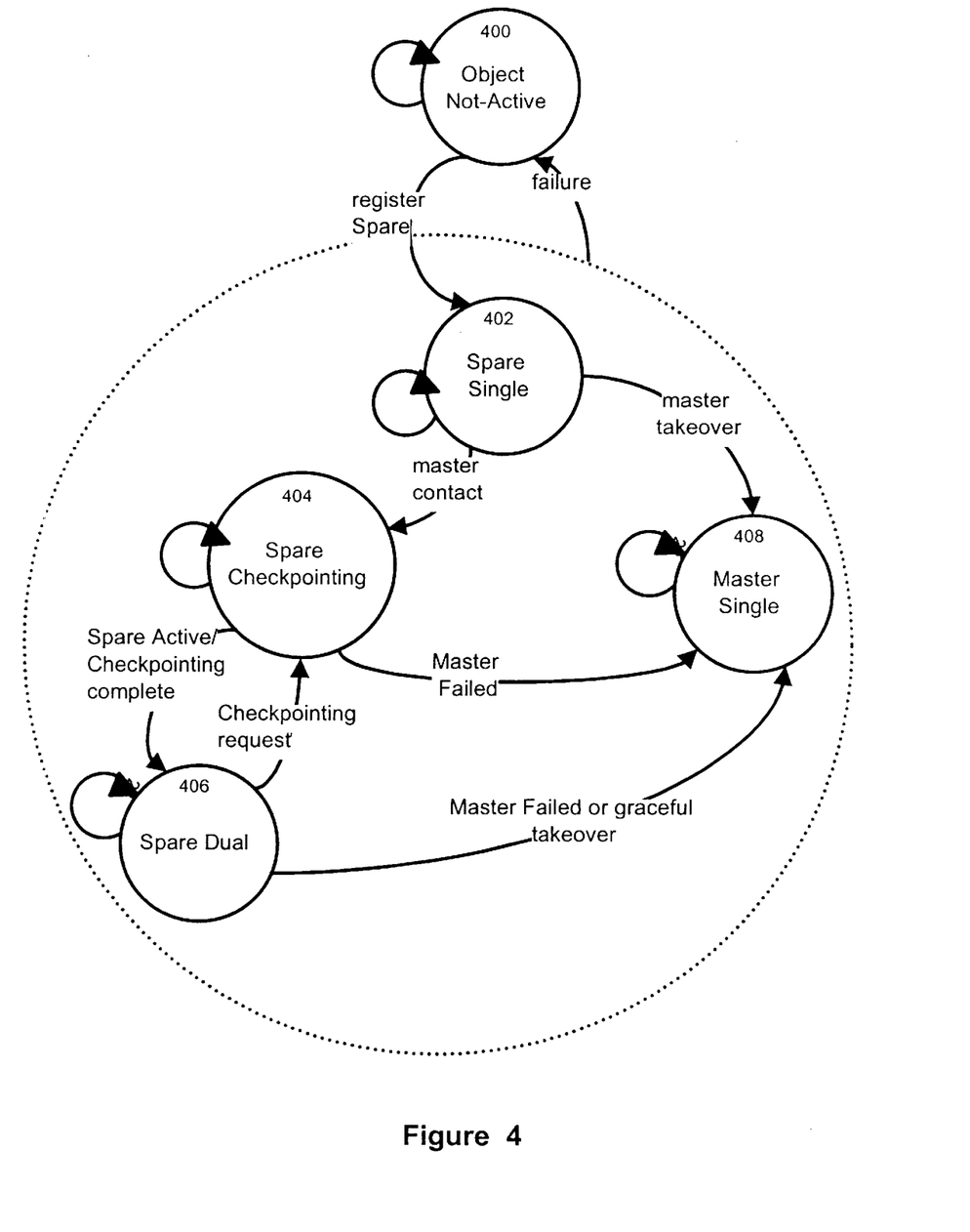
FIG. 4 shows a state transition diagram for a spare component.

The third attribute, the sparing state, is a typical state machine reflecting the current sparing state of the object. This attribute gets set through internal methods such as to be protected from unwanted tampering by other entities. The possible values of this entity depend on the sparing status. In the case where the sparing status is disabled only the not-active, Master Single and Spare Single states are valid such that an entity pre-configured as a master, once registered, can only be in the Master Single state and an entity pre-configured as a spare, once registered, can only be in the Spare Single state. If an entity is pre-configured as dynamic, its role is determined at the time of registration. Clearly, if sparing is disabled, the entity can never be assigned the spare operating mode and hence it must register as a master. As was previously mentioned, if a master already exists in the system at the same address at which the dynamic object is attempting to register as master, the registration is denied since only one master is permitted per service. If the sparing status is enabled the sparing state may take the following conditions or forms, namely not-active, Master Single, Master Checkpointing, Master Dual, Spare Single, Spare Checkpointing, Master Flush and Spare Dual. FIG. 3 shows the state transition diagram for an objet registering as a master and FIG. 4 shows the state transition diagram for an object registering as a spare with the Name Database both in cases where the sparing status is enabled. In the case of dynamic mode objects, the mode assigned by the Name Database defines which state diagram to observe. In other words, if an object is assigned as a master, it will follow the state transition diagram shown in FIG. 3 while if it is assigned as a spare, it will follow the state transition diagram as shown in FIG. 4. The description below specifies objects that have predefined master or spare mode operation. This description can be extended to dynamic mode objects by simply choosing the appropriate diagram depending on which mode has been assigned by the Name Database.

As shown in FIG. 3, the master object initially possesses a not-active state 300 and remains there until it issues a register message to the Name Database requesting that it may be granted master status. If the registration procedure is completed successfully, the master object then enters into the Master Single state 302 where it provides the services for which it was designed. The object remains in the Master Single state 302 until a spare associated with it is introduced in the system. The master object then enters the Master Checkpointing 304 state where it proceeds in transferring the values of all its dynamic data to the spare object. This data exchange state 304 is maintained until the master and the spare are synchronized. If the spare component fails during the Master Checkpointing state 304, the state of the master object reverts to the Master Single state 302. Once the checkpointing operation is finished and the spare becomes active, the master object enters the Master Dual state 306 during which the master and the spare occasionally exchange inquiry messages and journalling information. This is the fully functional state of a master system operating with sparing capability. During this state 306 the master supplies his regular service to his clients. At any point in this state 306, the spare may request a checkpointing operation to be performed at which point the master returns to the Master Checkpointing state 304. Typically the states will alternate between the Master Dual 306 and Master Checkpointing 304 states. If the spare fails in either of these states 304 306, the master returns to the Master Single 302 state. If the master fails in the Master Single 302, Master Checkpointing 304 or the Master Dual 306 states, it returns to the not-active state 300.

The state transition diagram for a spare object is shown in FIG. 4. The spare begins at the not-active state 400 and remains there until it issues a register message to the Name Database requesting that it be granted spare status. The spare then enters into the Spare Single state 402 where it remains until it can contact the master object with which it is associated or until it takes over as master, should the master fail. In the later case the spare assumes the Master Single state 408 and proceeds to supply the services to clients that where supplied previously by the failed master. In the former case, the spare enters the Spare Checkpointing 404 state where it receives the master's dynamic data. This state 404 is maintained until the master and the spare are synchronized. If the master component fails during the Spare Checkpointing state 404, the state of the spare takes over as the master and enters the Master Single state 408. Once the checkpointing operation is finished and the spare becomes active, the spare enters the Spare Dual state 406 during which the master and the spare occasionally exchange inquiry messages and journalling information. This is the fully functional state of a spare system. At any point during this state 406, the spare may request a checkpointing operation to be performed at any time at which point the spare returns to the Spare Checkpointing state 404. Typically the state of the spare will alternate between the Spare Dual 406 and Spare Checkpointing 404 states. If the master fails in either these states 404 406, the spare takes over the master's operations and enters the Master Single 408 state. If the spare fails in either the Spare Single 402, Spare Checkpointing 404, Spare Dual 406 or Master Single states, it returns to the not-active state 400.

The fourth attribute, the group identifier, is used when sparing is performed at the group level instead than at the level of the individual objects. Preferably this attribute stores the address of the identifier of the group manager. This parameter is pre-provisioned for objects to permit the introduction of group sparing and is set at the creation of the object. During group sparing, the group manager registers with the Name Database first, after which the members of the group register with the group manager. Finally the group manager issues a command to its members to register individually with the Name Database. In situations where objects are individually sparable, this group parameter is set to NIL at which point the objects can directly register with the Name Database. In applications where group sparing is not required, this parameter may be omitted from the object without detracting from the spirit of the invention.

The next attribute, the inquiry message interval, holds the time between two consecutive inquiry messages. In other words, this attribute defines the time period between successive messages issued by the spare to the master to monitor the operational state of the master. Preferably this value is expressed in milliseconds and is normally the same for all entities exchanging inquiry messages in a system. However, different values may be used for each master/spare pair without detracting from the spirit of the invention. Note that the shorter the time interval between the inquiry messages, the faster a spare component will notice a master failure, hence the faster the service switchover will be. However, the shorter the interval between inquiry messages, the higher the processor overhead. Hence, a compromise between a quick system recovery and processor time dedicated to inquiry message monitoring is required. This value may be set by external methods preferably at the initiation of the object. If no value is supplied a default value is used.

The final attribute, the inquiry message number, holds the number of inquiry messages or inquiry message acknowledgements that should be missed for a sparing entity to assume its sparing partner is faulty. As was the case for the inquiry message interval, this entity is usually the same for all object on a system, however it may be set individually for a master/spare pair. It is set by external methods, preferably at the initiation of the object.

OVERVIEW OF THE MAJOR PROCESSES

Figure 2:
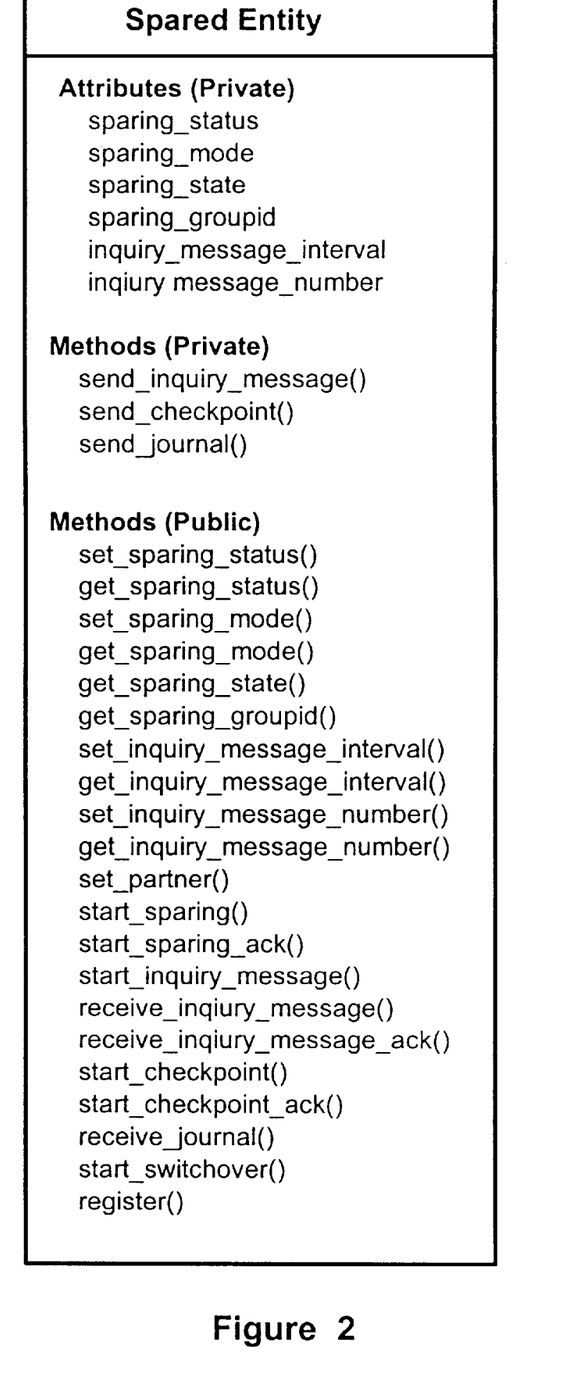
FIG. 2 is a diagram of a spared entity super-class that supplies objects which inherit it sparing capabilities.

The Spared Entity super-class also includes a set of methods to manipulate the attributes and to provide communication with other objects. The Spared Entity super-class methods can be divided into five distinct groups of methods: sparing interface, inquiry message, switchover, journalling and recovery. The Spared Entity object with its attributes and methods is shown in FIG. 2.

The sparing interface methods provide an external sparing interface to objects inheriting it. This group includes methods to enable/disable sparing, set sparing mode, start the sparing process as well as to obtain the values of some attributes. These methods are part of the public portion of the Spared Entity class. The majority of the functions in this group are used to initiate and access the attributes in the object. For example, a method named "set_sparing_status" may be used to set the sparing status attribute of the object to either the enable or disable state following the pseudocode shown in table 1.

TABLE 1

Pseudocode for set_sparing_status

Function set_sparing_status(new sparing status)
   IF new sparing status == enabled
      Set sparing status to new sparing status
   ELSE IF new sparing status == disabled
      Set sparing status to new sparing status
   ELSE return invalid status request message Similarly, methods may be used to observe the value of the attributes in the object. For example, a function named "get_sparing_status" could be used to obtain the current content of the sparing status attribute. A few methods do not enter in the category mentioned above and are used for communication purposes between the object and external entities such as the Name Database and other objects. For example, methods are required to register the objet with the Name Database and to communicate with other objects such as the master or spare entity.

Figure 5:
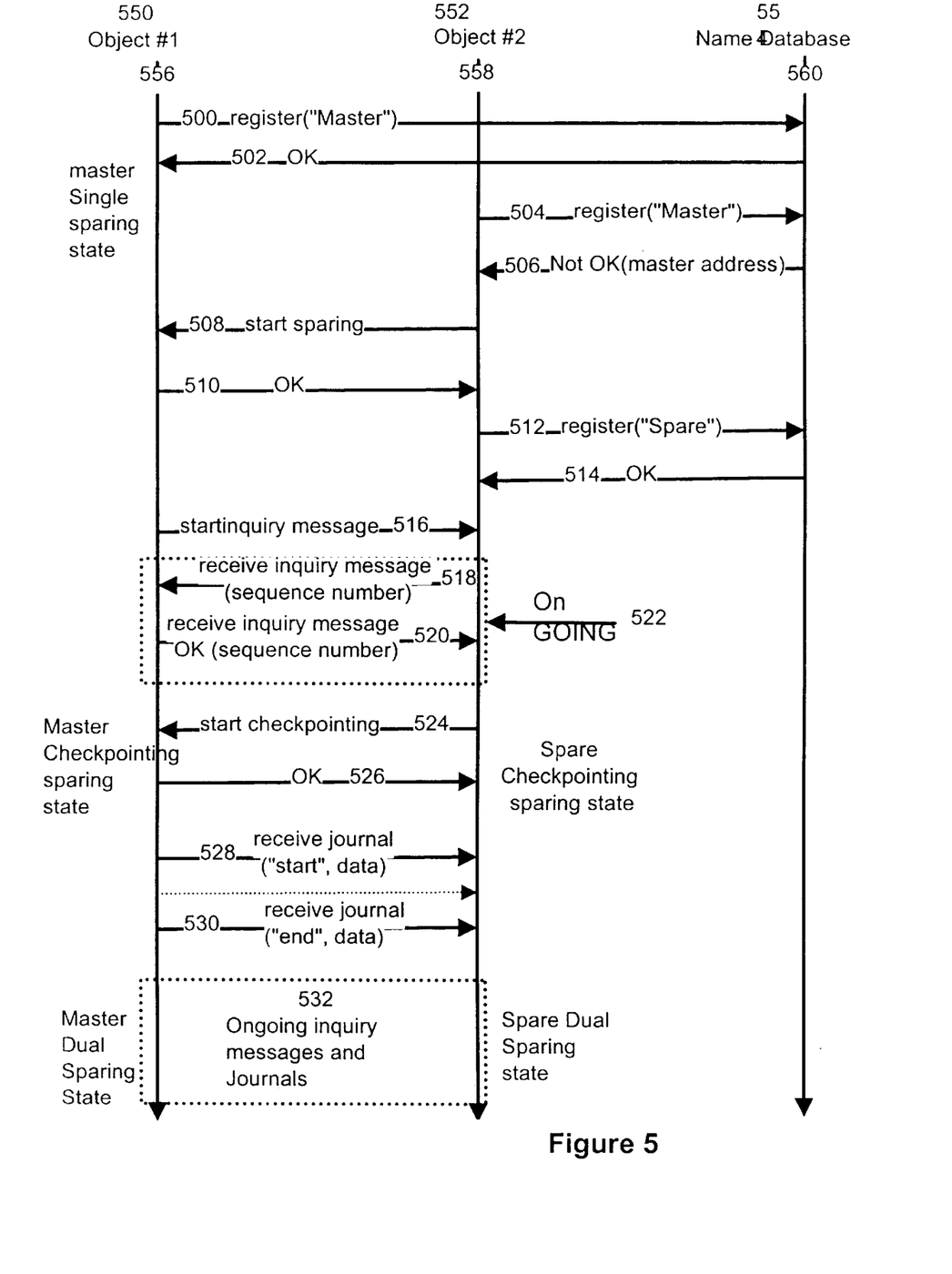
FIG. 5 shows a communication protocol diagram between a master/spare pair of objects and the Name Database.

A typical communication transaction between two objects capable of effecting the same tasks or services and the Name Database is shown in FIG. 5. The vertical lines in this diagram 556 558 560 from top to bottom represent the time flow. The first two lines 556 558 represent the time lines for Sparable Entity objects 550 552 or objects which inherit the Sparable Entity class. The last vertical line represents the time line for the Name Database 554, the component that keeps track of all the objects in the system, services provided by these objects and location of these objects. As shown in FIG. 5, Object #1 550 sends a register message 500 to the Name Database 554 specifying "Master" as the registration mode. The Name Database 554 acknowledges this request, and verifies that no other object is registered as master for the same services. At this point, the Name Database enters the name and location of object into its internal Database and sends a message to object #1 that his request has been granted 502 since no other object is registered for the same service. Object #1 550 enters into the Master Single state and proceeds in supplying the services for which it was designed. At a later time, a second object, Object #2 552 sends a register message 504 to the Name Database 554 requesting "Master" as the registration mode. Analyzing its contents, the Name Database 554, denies this request since Object #1 550 was already granted this mode and returns the address of Object #1 550 (for example the machine address and the socket number of the service) to Object #2 552. Object #2 552 sends a start sparing message 508 to Object #1 550 to request being his spare. The master, Object #1 550, acknowledges this request, sets his partner to being the spare component registering and sends a message to Object #2 accepting the start sparing request 510. Object #2 552 sets his partner to be Object #1 550, his new master, and sends a register message 512 to the Name Database requesting to be activated as a spare which in turn the Name Database acknowledges and accepts. The inquiry message operations are then initiated.

The inquiry message methods provide all the inquiry message-related functions. Inquiry messages are used to monitor the status of the master and of the spare. Signals are sent at a regular time interval from the spare to the master and, following the reception of these signals, the master replies. This set of methods also includes functions to set the inquiry message interval, which is the time between two successive inquiry messages, and the number of inquiry messages to miss before either the spare or the master is considered in failure and must be taken offline and replaced. The inquiry message operations are initiated after the master and spare objects have registered with the Name Database. Before beginning exchanging inquiry messages it may be necessary to set the inquiry message interval and the inquiry message number such as they are equal for the spare and the master component. Preferably, a method that sets either one of these attributes should send a message to the associated master or spare component such that they always have the same value. In a preferred sequence of operations, the master (Object #1) 550 initiates the inquiry message exchanges 516 with its spare (Object #2) 552. The spare then initializes its timer and calls a routine that generates sequence numbers and sends them to the master. A receive inquiry message 518 along with a sequence number is sent periodically to the master which replies to the sender by echoing the sequence number back 520. This operation is on going until one the entities fails or is forcibly replaced. Both the master and the spare keep an internal table, preferably using a circular buffer data structure, of the sequence numbers sent as well as those that have been acknowledged. The circular buffer is a well-known data structure in the art to which this invention pertains. What is needed in this buffer is two fields for each entry, one for the sequence number, which is preferably an integer, and another for a flag, which could be a bit or Boolean variable, indicating if the inquiry message with a particular sequence number has been acknowledged. On the spare side, every time a new inquiry message with a sequence number is sent, an entry is made to this table, deleting an older entry in the case of a circular buffer, and the acknowledgement flag associated with this entry is set to the Not Acknowledged value. A counter is incremented to indicate that one more inquiry message has not been received. Every time an inquiry message acknowledgement message is received, the table entry for this sequence number is marked as Acknowledged and the same counter used to keep track of the inquiry message sent is decremented to indicate that the object is waiting for one less inquiry message. If the value of this counter exceeds the inquiry message number allowable to be missed, the sparing partner of this object is assumed to be in failure. In the case where the object is operating as a master, it goes into the Master Single state and ceases communication with its now dysfunctional spare. In the case where the object was operating as a spare, it performs switch-over operations and then enters the Master Single state where it assumes the functionality of the now defunct master.

Figure 6:
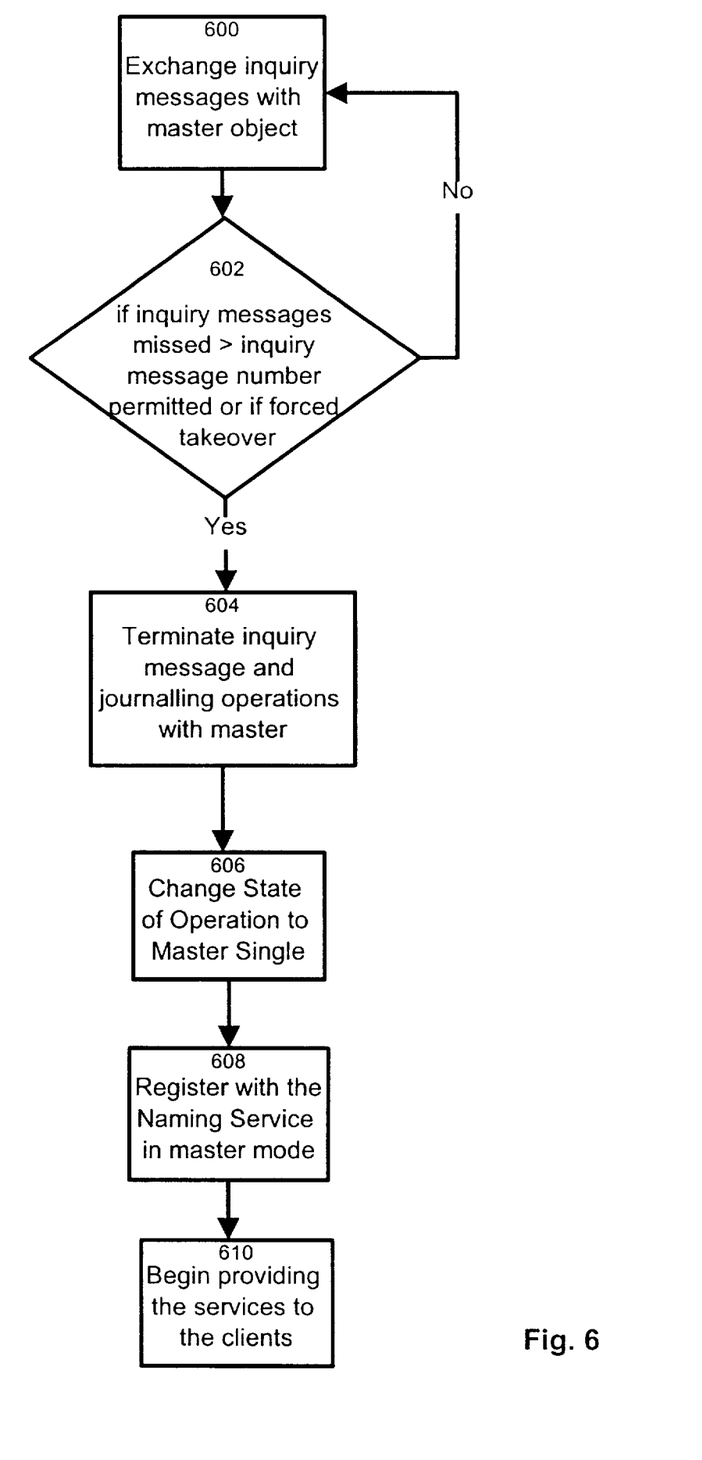
FIG. 6 shows a flow diagram illustrating the switch over sequence of events in the occurrence of a master failure.

The spare takes over the master operations using methods provided by the switch-over methods group. This group provides methods used to implement all the policies and interfaces required when the spare object takes over the master. All objects having sparing capabilities comprise these methods but the latter are only active in the spare component. The preferred flow of operation is shown in FIG. 6. Inquiry messages are exchanged 600 between the master and the spare at a predetermined interval. A test is performed 602 to determine if the number of inquiry messages missed is greater than the allowed valued or if a forced takeover has been initiated. In the case where it is not, inquiry messages are sent again 600. However, in the affirmative, the inquiry messages as well as the journals are terminated 604. A forced takeover may be initiated by the system manager for reasons such as introducing software upgrades and taking down a system for repairs. In this case, a special message may be used to indicate this forced take over for the Name Database. The object changes his state to Master Single 606 and registers with the Name Database in master mode 608. When these operations are completed, the object takes over the services that the master provided 610.

During the normal process of operation where the master and the spare are functioning with no faults, journals are sent from master to spare to keep track of the values of critical variables. The exact composition of the methods is application and object specific because each object will have a distinct set of attributes that are considered critical for journalling purposes. What is required at the master are methods to track the variables which are deemed critical, load these variables into a message structure and send to the journal from the master to the spare. At the spare, methods are needed to receive the messages, extract the data from the message structure and update the internal variables of the spare. Preferably the master and the spare store the location of their complementary entities (i.e. the master stores the location of the spare and vice versa) and therefore no interaction with the Name Database is necessary during journalling unless an error occurs and one of the components becomes disabled. The messages sent during the journalling operation may take various formats depending on the information to be sent. For example the message may contain a flag indicating the number of variables to be journalled in a particular transaction, followed by a list of the variables and their new value. In such a situation, the message journal (3, DATA1=85, DATA32="487–1963", DATA67={1,6,4,6 . . . }) indicates that 3 data items are to be journalled namely DATA1 DATA32 and DATA67 and their values are as indicated in the message.

Checkpointing is a particular case of journalling where all the dynamic data of the master is sent to the spare. Preferably, as shown in FIG. 5, checkpointing is initiated by the spare 524 immediately after it has been assigned as a spare system and has for purpose the synchronization of the data/state between the master and spare systems. The master enters into the Master Checkpointing state and sends an acknowledgment 526 to the spare that enters into the Spare Checkpointing state. After that the master proceeds in sending all its dynamic data to the spare by sending an indication of the beginning 528 and end 530 of the checkpointing operation. After this checkpointing operation is complete, the master enters the Master Dual state and the spare enters the Spare Dual state. During that time periodic inquiry messages and journals are sent 532 to watch the health of the master/spare system and to keep the master and the spare synchronized.

The sparing operations are transparent to the user and sparing capabilities could be added to existing system with little or no noticeable changes in operations. The overhead required may cause a slight slow down in operations but is dependent on the hardware on which the system is operating. Preferably, when a spare takes over master operations when the latter fails, the delay of the take over process is transparent to the users of the system.

COMPOSITE OBJECTS

In a possible variant of the invention, the invention provides a class that allows sparing for groups of objects instead of for individual objects. The preferred embodiment of this invention comprises a Spared Group Manager (GM) Class that inherits from the Spared Entity super-class and provides sparing at the group level.

Figure 7:
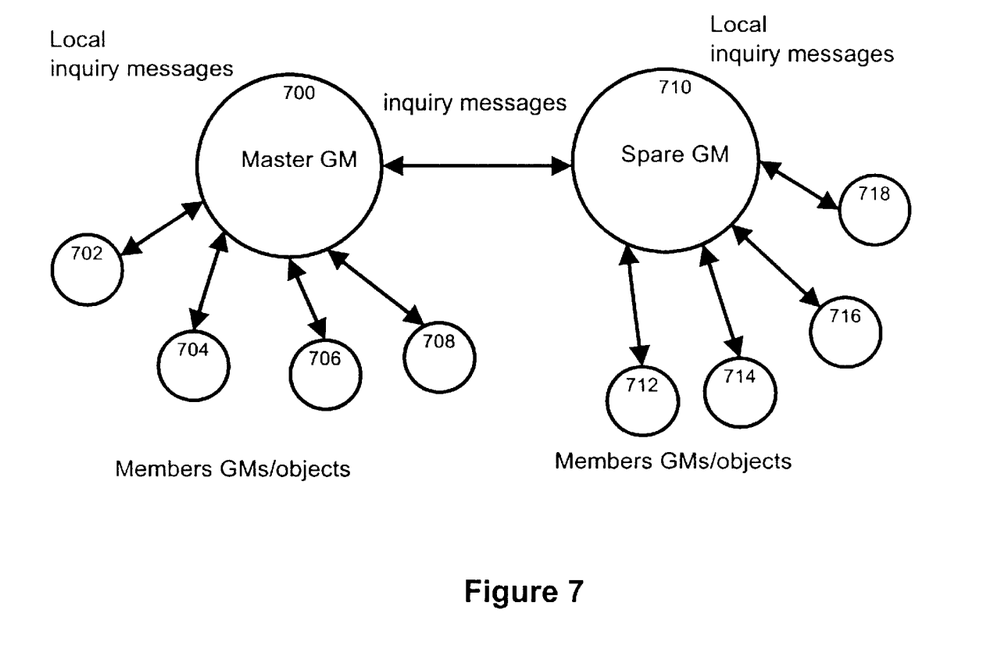
FIG. 7 shows a communication diagram of an embodiment of sparing at the group level.

The Spared Group Manager class (GM) comprises members that may be individually sparable objects and other GMs. A block diagram of a master/spare GM pair is shown in FIG. 7. All the members 702 704 706 708 registered with the master GM 700 are objects operating in the master mode and similarly, all the objects 712 714 716 718 registered with the Spare GM 720 are operating in the spare mode. Each Group Sparing Manager 700 710 maintains a list of all its registered members which may be located on any node in the distributed system. Inquiry messages are exchanged between the GM and its members and are also exchanged at the Group Manager level between the master manager and the spare manager. If a failure is located in one of the members of the spare group, only the GM is informed. However if a failure occurs in a member of the master group, a decision regarding the switch over at the group level is made. The registration with the Name Database is slightly different from that of individually sparable objects. The GM first registers with the Name Database who assigns its master or spare operating mode. Individual objects then register with their appropriate GM taking the operating mode of the GM and begin sending inquiry message information. Once all the members of the GM have been registered, the GM sends a "register with Name Database" message to all its members that proceed in registering in the appropriate mode (i.e. the mode of their GM) with the Name Database. Following registration with the Name Database, inquiry messages are periodically exchanged between the master and spare GM. Checkpointing is initiated between all the members of the master and spare GM and the behavior is similar to that of the Spared Entity class described previously. The exact behavior of a GM can be varied to accommodate different needs depending on the application. For instance, if it is required to provide sparing at the level of a computing node, we can include as members all the objects running on a given node in a GM which would be spared by another GM running on a separate node and whose components reside on a unique node.

Although the present invention has been described in considerable detail with reference to certain preferred embodiments thereof, variations and refinements are possible without departing from the spirit of the invention. For example in it is possible to use the spare to provide distributed processing in cases where the load is too heavy on the master or simply to improve the performance also known as load sharing. Also, although the description targets specifically object oriented code and design, the same principles and process can be applied to function oriented code by providing spare components to the functions, modules and data storage instead of to object. Therefore, the scope of the invention should be limited only by the appended claims and their equivalents.

We claim:

1. A computing apparatus including a program element, said program element being operative for implementing a group of functional entities on the computing apparatus, said group comprising:

a first object capable of effecting at least one predetermined task, said first object capable of selectively acquiring either one of an active status and a passive status, in said active status said first object is enabled of carrying out said predetermined task, in said passive status said first object being disabled from performing said predetermined task;

a second object capable of effecting said predetermined task;

data synchronization unit for effecting transfer of data in said second object utilized for effecting said predetermined task to said first object;

operational status determination unit operative to interact with said second object to derive a data element indicative of an operational status associated to said second object, said first object acquiring said active status when said data element is indicative of a predetermined operative condition.

2. A computing apparatus as defined in claim 1, wherein said predetermined operative condition is a condition in which said second object is not able to continue performing said predetermined task.

3. A computing apparatus as defined in claim 2, wherein said operational status determination unit includes an operational status inquiry message generation unit in said first object to issue an inquiry message to said second object.

4. A computing apparatus as defined in claim 3, wherein said operational status determination unit includes in said second object an acknowledgement message generation unit to issue an acknowledgement message to said first object in response to reception by said second object of the inquiry message issued by said operational status inquiry message generation unit.

5. A computing apparatus as defined in claim 4, wherein said operational status determination unit includes a counting unit in said first object for counting a number of inquiry messages issued to said second object to which said second object failed to generate corresponding acknowledgement messages.

6. A computing apparatus as defined in claim 5 wherein said operational status inquiry message generation unit issues periodically an inquiry message at predetermined instants in time.

7. A computing apparatus as defined in claim 6, wherein the inquiry message includes a certain data element, said acknowledgement message generation unit placing in response to the inquiry message containing the data element said acknowledgement message generation unit placing in the acknowledgement message said data element.

8. A computing apparatus as defined in claim 7, wherein said data element is a randomly generated number.

9. A computing apparatus as defined in claim 1, wherein said group of functional entities includes a Name Database.

10. A computing apparatus as defined in claim 9, wherein said group of functional entities includes a master/spare determination unit for selectively enabling said first object to acquire said active status.

11. A computing apparatus as defined in claim 10, wherein said master/spare determination unit includes in each one of said objects registration message generation unit for issuing to said Name Database an identification message to said Name Database.

12. A computing apparatus as defined in claim 11, wherein said master/spare determination unit includes in said Name Database an operational status assignment message generation unit to issue a message indicative of an operational status to be acquired by said first object.

13. A computing apparatus as defined in claim 12, wherein said first object acquires either one of said active status and passive status in response to the message indicative of an operational status.

14. A computing apparatus as defined in claim 13, wherein said second object is capable of selectively acquiring either one of an active status and a passive status, in said active status said first object is enabled of carrying out said predetermined task, in said passive status said first object being disabled from performing said predetermined task.

15. A computing apparatus as defined in claim 14, wherein said Name Database includes a data structure in which is stored data indicative of an operational status of said first object.

16. A computing apparatus as defined in claim 15, wherein said Name Database includes a data structure in which is stored data indicative of an operational status of said second object.

17. A machine readable storage medium containing a program element to direct a computing apparatus to implement a group of functional entities, said group comprising:

a first object capable of effecting at least one predetermined task, said first object capable of selectively acquiring either one of an active status and a passive status, in said active status said first object is enabled of carrying out said predetermined task, in said passive status said first object being disabled from performing said predetermined task;

a second object capable of effecting said predetermined task;

data synchronization means for effecting transfer of data in said second object utilized for effecting said predetermined task to said first object;

operational status determination means operative to interact with said second object to derive a data element indicative of an operational status associated to said second object, said first object acquiring said active status when said data element is indicative of a predetermined operative condition.

18. A machine readable storage medium as defined in claim 1, wherein said predetermined operative condition is a condition in which said second object is not able to continue performing said predetermined task.

19. A machine readable storage medium as defined in claim 18, wherein said operational status determination means includes an operational status inquiry message generation means in said first object to issue an inquiry message to said second object.

20. A machine readable storage medium as defined in claim 19, wherein said operational status determination means includes in said second object acknowledgement message generation means to issue an acknowledgement message to said first object in response to reception by said second object of the inquiry message issued by said operational status inquiry message generation means.

21. A machine readable storage medium as defined in claim 20, wherein said operational status determination means includes counting means in said first object for counting a number of inquiry messages issued to said second object to which said second object failed to generate corresponding acknowledgement messages.

22. A machine readable storage medium as defined in claim 21 wherein said operational status inquiry message generation means issues periodically an inquiry message at predetermined instants in time.

23. A machine readable storage medium as defined in claim 22, wherein the inquiry message includes a certain data element, said acknowledgement message generation means placing in response to the inquiry message containing the data element said acknowledgement message generation means placing in the acknowledgement message said data element.

24. A machine readable storage medium as defined in claim 23, wherein said data element is a randomly generated number.

25. A machine readable storage medium as defined in claim 17, wherein said group of functional entities includes a Name Database.

26. A machine readable storage medium as defined in claim 25, wherein said group of functional entities includes master/spare determination means for selectively enabling said first object to acquire said active status.

27. A machine readable storage medium as defined in claim 26, wherein said master/spare determination means includes in each one of said objects registration message generation means for issuing to said Name Database an identification message to said Name Database.

28. A machine readable storage medium as defined in claim 27, wherein said master/spare determination means includes in said Name Database operational status assignment message generation means to issue a message indicative of an operational status to be acquired by said first object.

29. A machine readable storage medium as defined in claim 28, wherein said first object acquires either one of said active status and passive status in response to the message indicative of an operational status.

30. A machine readable storage medium as defined in claim 29, wherein said second object is capable of selectively acquiring either one of an active status and a passive status, in said active status said first object is enabled of carrying out said predetermined task, in said passive status said first object being disabled from performing said predetermined task.

31. A machine readable storage medium as defined in claim 30, wherein said Name Database includes a data structure in which is stored data indicative of an operational status of said first object.

32. A machine readable storage medium as defined in claim 31, wherein said Name Database includes a data structure in which is stored data indicative of an operational status of said second object.

33. A method for sparing software in a computing apparatus, said method comprising the steps of:
   providing a first software object capable of effecting at least one predetermined task, said first object capable of selectively acquiring either one of an active status and a passive status, in said active status said first object is enabled of carrying out said predetermined task, in said passive status said first object being disabled from performing said predetermined task;
   providing a second software object capable of effecting said predetermined task;
   effecting at certain intervals transfer of data in said second object utilized for effecting said predetermined task to said first object;
   interacting at certain intervals with said second object to derive a data element indicative of an operational status associated to said second object, said first object acquiring said active status when said data element is indicative of a predetermined operative condition.

* * * * *